(12) United States Patent
Marcus et al.

(10) Patent No.: US 11,674,556 B1
(45) Date of Patent: Jun. 13, 2023

(54) BAND BRAKE FOR BACKDRIVABILITY CONTROL

(71) Applicant: Amazon Technologies, Inc., Seattle, WA (US)

(72) Inventors: Beth A. Marcus, Bedford, MA (US); John William Romanishin, Cambridge, MA (US)

(73) Assignee: Amazon Technologies, Inc., Seattle, WA (US)

( * ) Notice: Subject to any disclaimer, the term of this patent is extended or adjusted under 35 U.S.C. 154(b) by 67 days.

(21) Appl. No.: 17/306,233

(22) Filed: May 3, 2021

Related U.S. Application Data

(63) Continuation of application No. 16/680,061, filed on Nov. 11, 2019, now Pat. No. 11,022,191.

(51) Int. Cl.
| | | |
|---|---|---|
| *B25J 9/16* | (2006.01) | |
| *F16D 49/08* | (2006.01) | |
| *F16D 63/00* | (2006.01) | |
| *F16D 65/16* | (2006.01) | |
| *F16D 121/20* | (2012.01) | |

(52) U.S. Cl.
CPC ............ *F16D 49/08* (2013.01); *B25J 9/1641* (2013.01); *F16D 63/002* (2013.01); *F16D 65/16* (2013.01); *F16D 2121/20* (2013.01)

(58) Field of Classification Search
CPC ......... A61B 17/16; A61B 34/20; A61B 34/30; A61F 2/70; B25J 9/0021; B25J 9/10; B25J 9/1638; B25J 9/16; B25J 9/1633; B25J 9/1612; B25J 9/1641; F16D 65/14; F16D 49/08; F16D 63/002; F16D 65/16; F16D 63/16; F16D 2121/20
USPC ........................ 188/77 W; 254/322; 606/130
See application file for complete search history.

(56) References Cited

U.S. PATENT DOCUMENTS

| | | | |
|---|---|---|---|
| 6,948,598 B2 | 9/2005 | Koike et al. | |
| 11,022,191 B1 * | 6/2021 | Marcus | ................... F16D 65/16 |
| 11,391,366 B2 * | 7/2022 | Klassen | ................ F16H 1/2863 |
| 2011/0001102 A1 | 1/2011 | Hossler | |
| 2017/0112505 A1 * | 4/2017 | Morash | ................... A61B 34/30 |
| 2017/0291314 A1 * | 10/2017 | Hosek | ....................... B25J 9/104 |
| 2018/0079090 A1 * | 3/2018 | Koenig | ................... G16H 40/63 |
| 2018/0117775 A1 * | 5/2018 | Podnar | .................... B65G 47/90 |
| 2019/0091853 A1 | 3/2019 | Tohsimitsu | |
| 2019/0152056 A1 | 5/2019 | Mottram et al. | |
| 2019/0262985 A1 | 8/2019 | Yoshimura et al. | |

(Continued)

*Primary Examiner* — Christopher P Schwartz
(74) *Attorney, Agent, or Firm* — Thomas | Horstemeyer, LLP

(57) ABSTRACT

A system and method for backdrivability control of end effectors in robotic systems are described. In one example, a robotic system includes a joint in a kinematic chain, an end effector at an end of the kinematic chain, and an assembly for backdrivability control of the joint. The assembly includes a frame comprising a flexure arm and a circular clearance area that extends around the joint, a brake band having one end secured along the circular clearance area and a second end secured at an end of the flexure arm, and a brake actuator configured to selectively pull the end of the flexure arm and tighten the brake band around the joint. The brake actuator can be actuated to tighten the brake band around the joint, arresting or dampening motion in the kinematic chain of the system for certain movements.

20 Claims, 7 Drawing Sheets

(56) References Cited

U.S. PATENT DOCUMENTS

2020/0124163 A1 4/2020 Klassen
2020/0282558 A1* 9/2020 Kim ..................... B25J 9/1607

* cited by examiner

BAND BRAKE FOR BACKDRIVABILITY CONTROL

CROSS-REFERENCE TO RELATED APPLICATIONS

This application is a continuation of U.S. Non-Provisional patent application Ser. No. 16/680,061, titled "BAND BRAKE FOR BACKDRIVABILITY CONTROL," filed on Nov. 11, 2019, which is incorporated herein by reference in its entirety.

BACKGROUND

Robotic systems are built using a range of engineering and science disciplines, includes mechanical engineering, electrical engineering, computer science, and others. Robotic systems are also designed and constructed to incorporate more complicated control, feedback, and information processing systems to handle more complicated tasks. Robotic systems can be used for many different purposes, including those for which humans are not well suited, such as in dangerous environments and for repetitive manufacturing processes.

Many robotic systems rely upon motors for movement. Motors have limitations, however, which lead to design constraints. Direct current (DC) motors, for example, often run at higher speeds and with less torque than desired. Transmission systems are often relied upon to reduce the speed and increase the torque of DC motors. The transmission systems can include an arrangement of gears, belts, pullies, and other elements. Gearboxes are a common type of transmission system.

BRIEF DESCRIPTION OF THE DRAWINGS

Aspects of the present disclosure can be better understood with reference to the following drawings. It is noted that the elements in the drawings are not necessarily to scale, with emphasis instead being placed upon clearly illustrating the principles of the embodiments. In the drawings, like reference numerals designate like or corresponding, but not necessarily the same, elements throughout the several views.

DETAILED DESCRIPTION

As noted above, many robotic systems rely upon motors for movement. However, direct current (DC) motors, for example, often run at higher speeds and with less torque than desired. Transmission systems are often relied upon to reduce the speed and increase the torque of DC motors. The transmission systems can include an arrangement of gears, belts, pullies, and other elements. Gearboxes are a common type of transmission system.

A motor is backdrivable if it is possible to turn or rotate the output shaft of the motor backwards when the motor is powered off. It is typically easy to backdrive a DC motor when the motor is powered off. It is more difficult to backdrive a motor with a gearbox, depending upon the gear reduction ratio and the efficiency of the reducer. A motor with gearbox is backdrivable if it is possible to rotate the output shaft of the gearbox when the motor is powered off. Generally, the higher the gear reduction ratio, the more torque it takes to backdrive the motor. Some gearboxes make it nearly impossible to backdrive a motor without the application of significant torque. At the same time, some robotic systems rely upon motors that are backdrivable while others do not. It may be a design requirement for a robotic arm to hold a position, even under weight and gravity, when a motor of the arm is powered off. In that sense, the use of a gearbox may be desirable in robotic systems to hold the position of a robotic arm, for example, when a motor of the arm is powered off. However, gearboxes can be bulky and interfere with mechanical linkages and other feedback and control systems. Gearboxes can also introduce certain design and costs constraints.

In the context of the design concerns outlined above, systems and devices for backdrivability control of motors are described. The brake assembly devices described herein can be relied upon to control the backdrivability of motors in robotic systems, for example, while also reducing or eliminating the need for gearboxes in some robotic system applications. In one example, a brake assembly device for backdrivability control includes a frame having a clearance area. The brake assembly is positioned so that the rotor of the motor extends through the clearance area. Among other components, the brake assembly includes a brake band secured at one distal end along the clearance area, extending around a periphery of the clearance area, and secured at a second distal end at a flexure arm of the frame. The brake assembly also includes a brake actuator including a permanent magnet at the distal end of the flexure arm and an electromagnet secured to the fame. The brake actuator can be energized to tighten the brake band around the rotor of the motor, preventing motion of the rotor even when the motor is powered off. The brake assembly can reduce the size and complexity of robotic systems and facilitate new types of movements in robotic systems.

Figure 1:
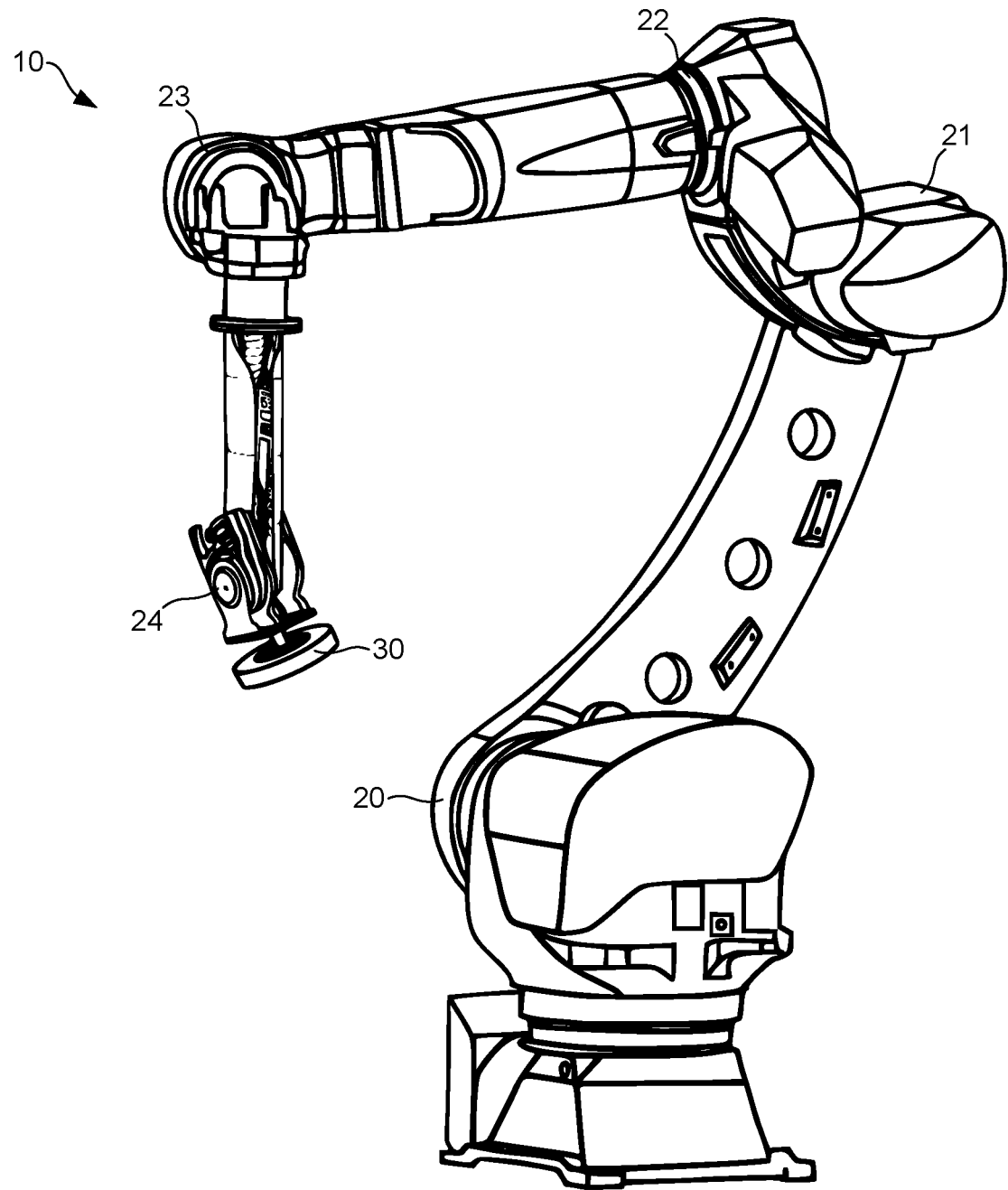
FIG. 1 illustrates an example robotic arm according to an example embodiment of the present disclosure.

FIG. 1 illustrates an example robotic arm 10 in a materials handling facility according to an example embodiment of the present disclosure. The robotic arm 10 is one example of a robotic system that can incorporate the brake assemblies described herein for backdrivability control. The robotic arm 10 can be relied upon to pick and place items in a materials handling facility, for example, for another suitable purpose. The backdrivability control concepts and brake assemblies described herein can be applied to other robotic and control systems however, for residential, commercial, and industrial applications.

The robotic arm 10 is a type of mechanical arm capable of movements similar to those of a human arm. The robotic arm 10 includes a number links or joints 20-24 that allow rotational and translational displacement or movement. The links or joints 20-24 form a kinematic chain, and the kinematic chain terminates with an end effector 30. The end effector 30 is capable of picking and placing relatively small items and, to some extent, is analogous to the human hand. The illustration of the end effector 30 in FIG. 1 is provided as an example, and other types of end effectors can be relied upon. The end effector 30 can pick an item or object through gripping or grabbing armatures or linkages, the use of vacuum or suction, other means, and combinations thereof.

The links or joints 20-24 can include one or more DC motors and, in some cases, gearboxes. The sizes of the joints 20-24 can depend, in large part, on whether or not a gearbox is used in the joint and also the gear reduction ratio of the gearbox. The size of the joint 24, which is the last joint before the end effector 30, can be a particular concern in the design and operation of the robotic arm 10. If the robotic arm 10 is designed for picking and placing particularly small items, for example, it can be desirable to reduce the size of the joint 24, which terminates with the end effector 30. A wider range of different types and styles of end effectors can be used if the size of the joint 24 is reduced. Thus, it can be desirable to reduce the size of the joint 24, among other links or joints in the robotic arm 10. Additionally, if the size of the joint 24 is reduced, it can be easier to route cabling, vacuum tubes, and other control and operating linkages to the end effector 30.

One way to reduce the size of the joint 24 is to remove any gearbox from the joint 24 and rely upon the direct drive of a motor in the joint 24. For certain purposes, such as for picking relatively smaller items, it might not be necessary for the joint 24 to include a gearbox for increased torque. In that case, the size of the joint 24 can be reduced significantly, allowing for the use of other types and styles of end effectors on the robotic arm 10. However, the removal of the gearbox from the joint 24 can lead to other problems, such as less backdrivability control in the joint 24. For example, it can be relatively difficult, if even possible, to brake or halt movement in the joint 24 without a gearbox. The systems and devices described herein can help to achieve backdrivability control by halting or arresting of the motion of motors in robotic systems when the motors are powered off, for example, or for other purposes. The braking devices described herein can also be actuated or controlled electronically and can be directed by embedded control and other computer systems.

Figure 2:
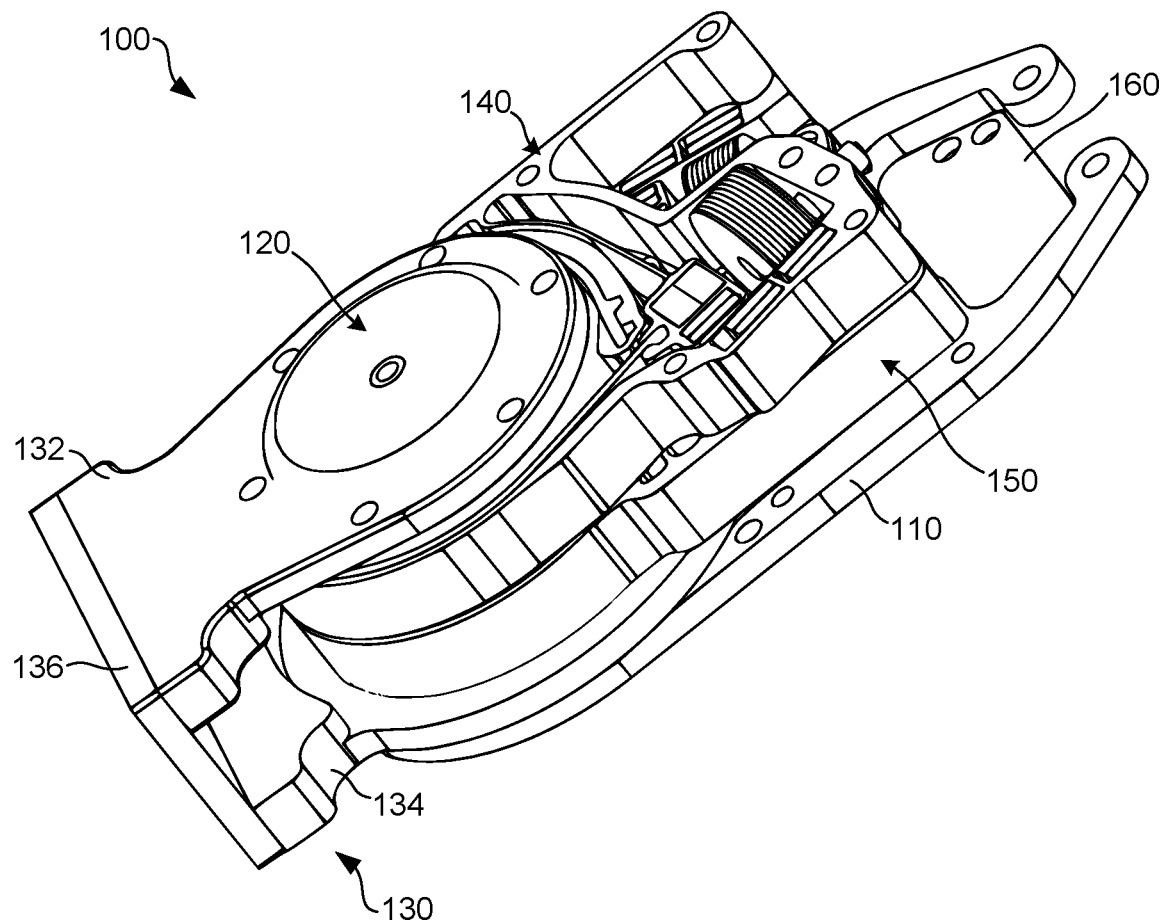
FIG. 2 illustrates an example backdrivability control system according to various aspects of the embodiments of the present disclosure.

FIG. 2 illustrates an example backdrivability control system 100 according to various aspects of the embodiments of the present disclosure. Among other components, the system 100 includes a backing mount 110, a motor 120, a linkage 130 secured to the motor 120, and brake assemblies 140 and 150 for backdrivability control of the motor 120. The linkage 130 includes a first link arm 132 secured at one side of a rotor of the motor 120, a second link arm 134 secured at another side of the rotor, and a link base 136 that extends between the first link arm 132 and the second link arm 134. The backdrivability control system 100 can form part of the joint 24 in the robotic arm 10 shown in FIG. 1, for example, or other joints or linkages. The end effector 30 in FIG. 1, among other types of end effectors, can be secured to the link base 136, and the backing mount 110 can be secured to an armature or other linkage secured with the joint 23 or other mechanical linkages of the robotic arm 10.

The stator of the motor 120 is mounted to the backing mount 110. The frames of the brake assemblies 140 and 150 are also mounted and secured to the backing mount 110. The rotor of the motor 120 extends through circular clearance areas of the brake assemblies 140 and 150. When the brake assemblies 140 and 150 are not activated, the rotor of the motor 120 is free to move (i.e., turn or spin) within the clearance areas. However, when one or both of the brake assemblies 140 and 150 are activated, a brake band is tightened around the rotor of the motor 120 to close the clearance areas, holding, fixing, or arresting the rotor in place to provide backdrivability control. Alternatively, the brake assemblies 140 and 150 can dampen or restrain the rotor of the motor 120, rather than arrest it, as described in further detail below.

A controller 160 is also mounted to a back side of the backing mount 110 on a control circuit board but can be mounted at another location in other embodiments. The controller 160 can include an embedded control system (or part of such a control system) for the backdrivability control system 100 and, in some cases, other motorized systems in the robotic arm 10. In that sense, the controller 160 can include one or more motor drivers, brake drivers, analog-to-digital converters, digital-to-analog converters, processors, memories, and communications interfaces, among other control circuitry components, implemented using a combination of hardware and software, for example. The controller 160 is configured to direct the operation of the backdrivability control system 100 by providing power and control signals to and receiving feedback signals from the motor 120 and the brake assemblies 140 and 150. As an example, the controller 160 can direct the motor 120 to move a certain distance in a clockwise or counter-clockwise direction and to stop at certain positions. The controller 160 can also direct the brake assemblies 140 and 150 to brake, hold, dampen, or restrain the motor 120 (i.e., the rotor of the motor) from movement. The controller 160 can direct the motor 120 to move, and direct the brake assemblies 140 and 150 to brake or restrain the motor 120, based on control and communications signals from another controller and/or computing systems.

Figure 3:
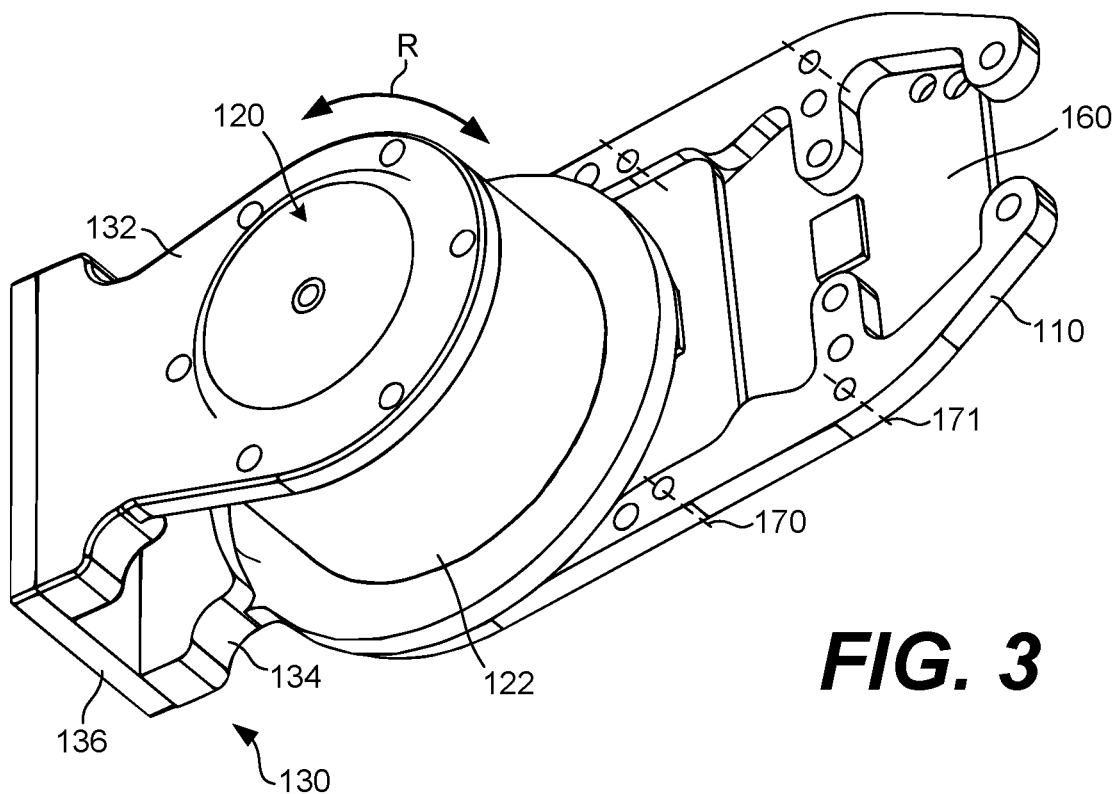
FIG. 3 illustrates a motor and mount of the backdrivability control system shown in FIG. 2 according to various aspects of the embodiments of the present disclosure.

FIG. 3 illustrates the motor 120 and the backing mount 110 of the backdrivability control system 100 shown in FIG. 2. The brake assemblies 140 and 150 are omitted from view in FIG. 3 so that the rotor 122 of the motor 120 can be shown. The stator of the motor 120 is within the rotor 122 and mounted to the backing mount 110. The motor 120 can be embodied as any suitable type of motor. As examples, the motor 120 can be embodied as a brushed or brushless DC motor, such as a permanent magnet, stepper, series, shut, or compound motor, although other types of motors can be relied upon. When the motor 120 is energized with power from the controller 160, the rotor 122 can rotate, clockwise or counter-clockwise, in the direction "R," and the linkage 130 will move with the rotor 122. The motor 120 can also include position, speed, force, torque, and other sensors, and the controller 160 can receive position, speed, and other data from the sensors to control the operation of the motor 120. The controller 160 can receive position, speed, and other data from the sensors to control the operation of the motor 120. The controller 160 can also rely upon vision (i.e., camera-based) data and other feedback systems to direct operations.

As noted above, a motor without a gearbox is relatively smaller than a motor with a gearbox, and the motor 120 does not include a gearbox. Without a gearbox, the rotor 122 may rotate fairly easily with the application of force when powered off (i.e., without the supply of energizing power). Depending on the manner in which the backing mount 110 and motor 120 are oriented (which can vary over time if incorporated into a robotic system), the weight of the linkage 130, alone, can be sufficient to backdrive the motor 120 when powered off. Thus, it might not be possible to hold the rotor 122 at a certain position, particularly when the motor 120 does not include a gearbox.

Figure 4:
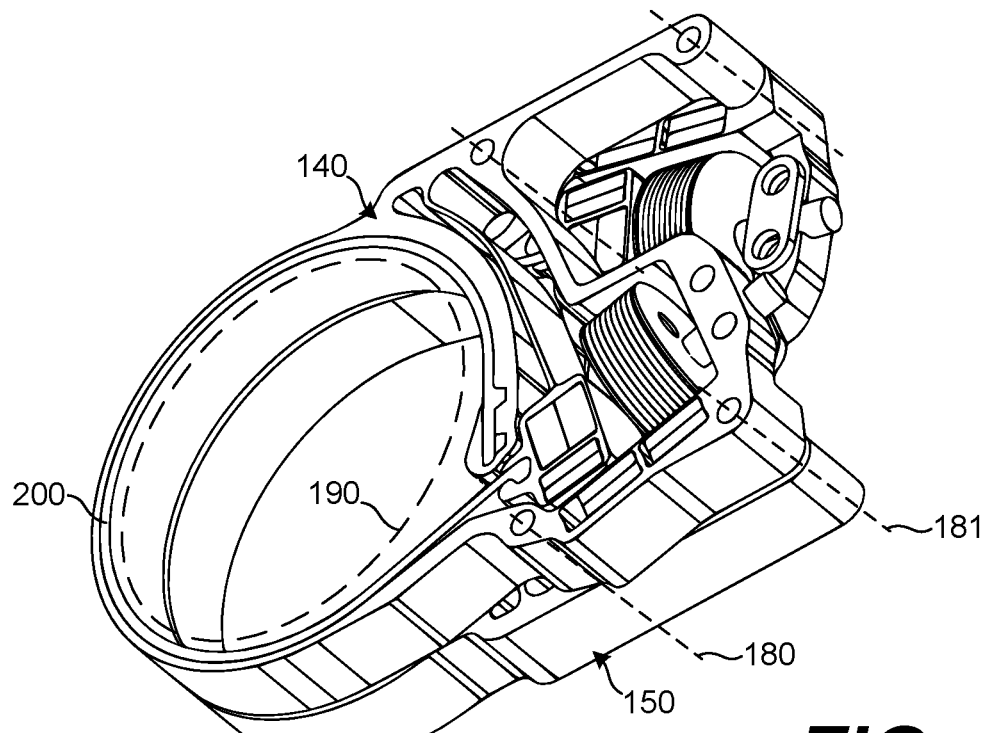
FIG. 4 illustrates a brake assembly of the backdrivability control system shown in FIG. 2 according to various aspects of the embodiments of the present disclosure.

FIG. 4 illustrates the brake assemblies 140 and 150 of the backdrivability control system 100 shown in FIG. 2. The brake assemblies 140 and 150 of the backdrivability control system 100 are designed to hold the rotor 122 at a certain, determined position, as directed by the controller 160. The brake assemblies 140 and 150 are similar in structure and function as compared to each other. As described in further detail below, the brake assemblies 140 and 150 can be the same in structure and function, although the brake assembly 150 is rotated as compared to the brake assembly 140 as shown in FIG. 4. Working together, the brake assemblies 140 and 150 can be relied upon to prevent both clockwise and counter-clockwise rotation of the rotor 122. In some cases, one of the brake assemblies 140 and 150 can be omitted to save costs.

Referring between FIGS. 3 and 4, a mechanical fastener, such as a screw, can be inserted through the fastener aperture 170 in the backing mount 110 and through the fastener aperture 180 in the frames of the brake assemblies 140 and 150, to secure them together. Similarly, a screw can be inserted through the fastener aperture 171 in the backing mount 110 and through the fastener aperture 181 in the frames of the brake assemblies 140 and 150, to secure them together. Other apertures in the backing mount 110 and the brake assemblies 140 and 150 can be relied upon to secure the brake assemblies 140 and 150 to the backing mount 110.

The frames of the brake assemblies 140 and 150 include circular clearance areas, and the circular clearance area 190 of the brake assembly 140 is identified in FIG. 4. A brake band 200 of the brake assembly 140 is also identified in FIG. 4, and the brake assembly 150 also includes a similar brake band. The brake band 200 extends around the circular clearance area 190. When the brake assemblies 140 and 150 are mounted and secured to the backing mount 110, as shown in FIG. 2, the rotor 122 of the motor 120 extends through the circular clearance area 190 of the brake assembly 140. The rotor 122 of the motor 120 also extends through a similar circular clearance area of the brake assembly 150. The circular clearance area 190 is large enough to permit the rotor 122 to rotate freely within it without any mechanical interference, while the brake band 200 is not being tightened or pulled. However, the brake band 200 can be tightened or pulled by a brake actuator of the brake assembly 140 based on control provided by the controller 160. As described in further detail below with reference to FIG. 5, the brake band 200 can be tightened around the rotor 122, to mechanically interfere with the rotor 122 and prevent it from moving, particularly when the motor is powered down. In that way, the brake assembly 140 can be used to control the backdrivability of the motor 120. The brake assembly 150 provides a similar function as described below.

Figure 5:
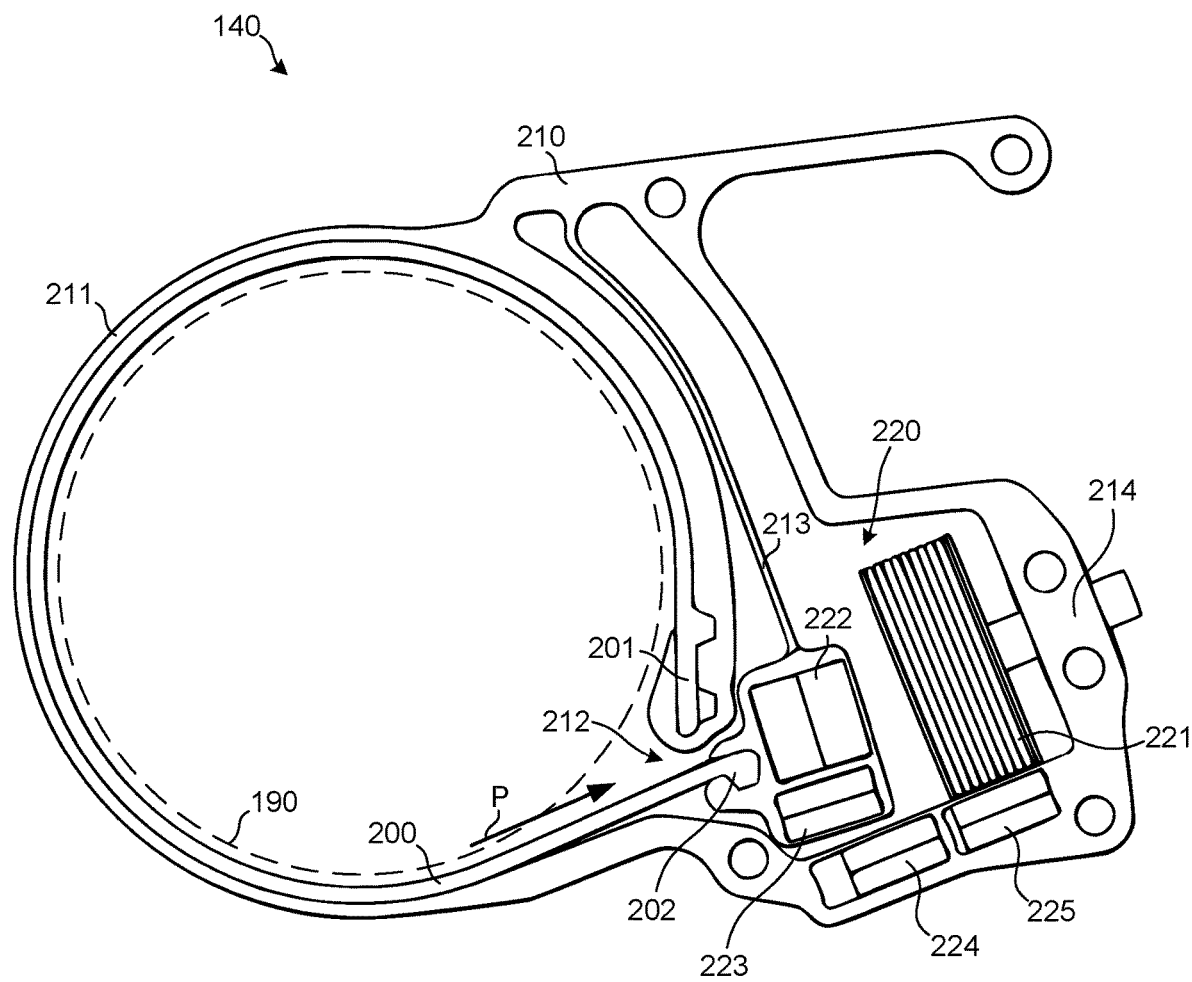
FIG. 5 illustrates a plan view of a brake assembly of the backdrivability control system shown in FIG. 2 according to various aspects of the embodiments of the present disclosure.

FIG. 5 illustrates a plan view of the brake assembly 140 of the backdrivability control system 100 shown in FIG. 2. The brake assembly 140 includes a frame 210, a brake band 200, and a brake actuator 220. The frame 210 can be formed from aluminum or other suitable materials using an additive, subtractive, or other manufacturing techniques. The frame 210 includes a frame ring 211 that extends around the circular clearance area 190. A constriction channel 212 provides an opening in the frame ring 211, and the brake band 200 extends, in part, through the constriction channel 212. The frame 210 also includes a flexure arm 213 and a mount 214 for an electromagnet 221 of the brake actuator 220, which are described in further detail below. As shown in FIG. 5, the flexure arm 213 is a relatively long, thin arm of material of the frame 210. The flexure arm 213 will flex or bend under forces as described below.

The brake band 200 includes a first distal end 201 secured along the circular clearance area 190. The brake band 200 extends around a periphery of the circular clearance area 190 and through the constriction channel 212. A second distal end 202 of the brake band 200 is secured at a distal end of the flexure arm 213 as shown in FIG. 5. The brake band 200 can be formed from a flexible material, such as a relatively rigid rubber, flexible plastic, or other material. In other cases, the brake band 200 can be formed from a thin metal or other, more rigid, material. The brake band 200 can have a smooth or regular surface or a rough or coarse surface, depending upon the needs for braking or restraining the motor 120. The surface of the brake band 200 can include detents, ridges, or other surface features to control the extent of friction with the rotor 122. The cross-section or width of the brake band 200 can also vary as needed. In any case, the brake band 200 should be formed from a material capable of tightening around and holding the rotor 122 of the motor 120 in place based on the use case or application (i.e., the particular type of robotic system, the expected weights or forces, etc.).

In FIG. 5, the brake assembly 140 is shown in an open configuration. The brake band 200 is sized to extend around a periphery of the circular clearance area 190 and rests against the frame ring 211 in this configuration. The brake band 200 is large enough to allow sufficient clearance for the rotor 122 of the motor 120 to rotate freely. On the other hand, the brake band 200 can be pulled and tightened around the rotor 122 in a braking configuration. Particularly, with the first distal end 201 of the brake band 200 anchored along the frame ring 211, a force can be applied by the brake actuator 220 to pull the second distal end 202 of the brake band 200. The second distal end 202 of the brake band 200 can be pulled through the constriction channel 212 in the braking configuration, and the brake band 200 will tighten around the rotor 122, mechanically interfering with and holding, binding, fixing, or arresting the rotor 122 in place, even against significant counteractive forces.

The brake actuator 220 is designed to transition the brake assembly 140 from the open configuration to the braking configuration. Although a particular example of the brake actuator 220 is provided below, with a certain arrangement of permanent magnets, an electromagnet, and a flexure arm for a bi-stable mechanism, other brake actuator arrangements are within the scope of the embodiments. For example, the positions of the permanent magnets and the electromagnet shown in FIG. 5 can vary as compared to that shown.

In one embodiment, the brake actuator 220 is a magnetic bi-stable mechanism, and it is stable in both the open configuration and in the braking configuration. In other embodiments, the brake actuator 220 can offer a granular or continuously-controllable range of forces for dampening or restraining movement. The brake actuator 220 includes an electromagnet 221 and a number of permanent magnets 222-225. The electromagnet 221 comprises a coil of wire. The wire can be wrapped around a bobbin, a permanent magnet, a core of ferromagnetic material, or another suitable material. As one example, the electromagnet 221 can be embodied as a voice coil, although related types of electromagnets can be relied upon. The electromagnet 221 is designed to generate a magnetic field based on the supply of energizing current through the coil. The control of energizing current can be supplied by the controller 160 using any suitable current driver semiconductors.

The permanent magnets 222-225 are individually seated and secured to the frame 210 of the brake assembly 140. The permanent magnets 222-225 can be seated or secured in any suitable way, including through the use of mechanical detents or interferences, friction fits, mechanical fasteners, adhesives, other suitable means, or combinations thereof. The permanent magnet 222 is the largest and strongest of the permanent magnets 222-225 and is seated and secured at the distal end of the flexure arm 213. The permanent magnet 222 is oriented such that the magnetic field of the permanent magnet 222 is generally aligned to interact with the magnetic field of the electromagnet 221, as described below, to enable the braking configuration of the brake assembly 140. The permanent magnets 223 and 224, on the other hand, are arranged to hold the flexure arm 213 still and maintain the brake assembly 140 in the open configuration. The permanent magnets 223 and 224 are arranged such that the magnetic fields generated by the permanent magnets 223 and 224 oppose each other, and the permanent magnets 223 and 224 push away from each other as arranged in the brake assembly 140.

When the electromagnet 221 is energized through the supply of electric current by the controller 160, the permanent magnet 222 is attracted (or more attracted) to the electromagnet 221. The attraction pulls the flexure arm 213 and, thus, the brake band 200 in the direction "P," tightening the brake band 200, transitioning the brake assembly 140 to the braking configuration to hold or fix the rotor 122 in place and provide backdrivability control. In this braking configuration, the magnetic fields of the permanent magnets 223 and 224 are brought into closer alignment with each other, although the fields oppose each other. When the supply of electric current to the electromagnet 221 is halted or stopped by the controller 160, the permanent magnet 222 is no longer attracted (or attracted as much) to the electromagnet 221. In that case, the opposing magnetic fields of the permanent magnets 223 and 224 are strong enough to push the flexure arm 213 back to the open configuration shown in FIG. 5 and release the rotor 122. The permanent magnet 225 helps to balance and speed changes among the magnetic fields in the bi-stable mechanism.

Figure 6A:
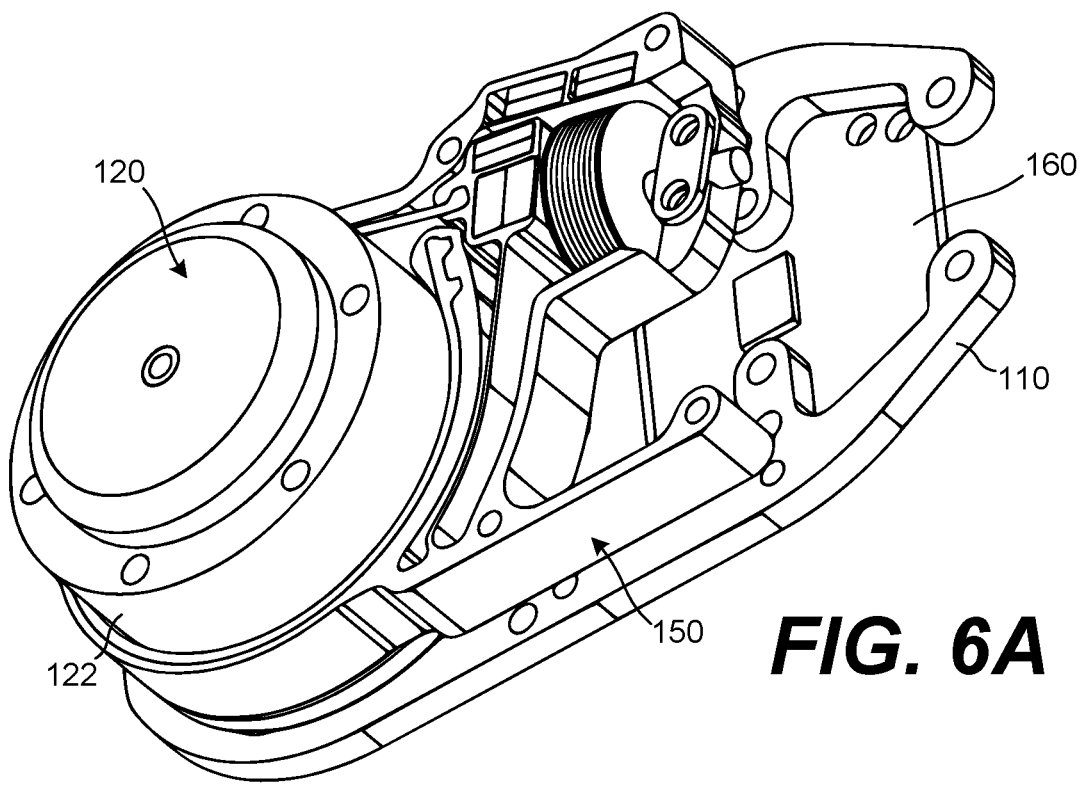
FIG. 6A illustrates a first brake assembly of the backdrivability control system shown in FIG. 2 according to various aspects of the embodiments of the present disclosure.
Figure 6B:
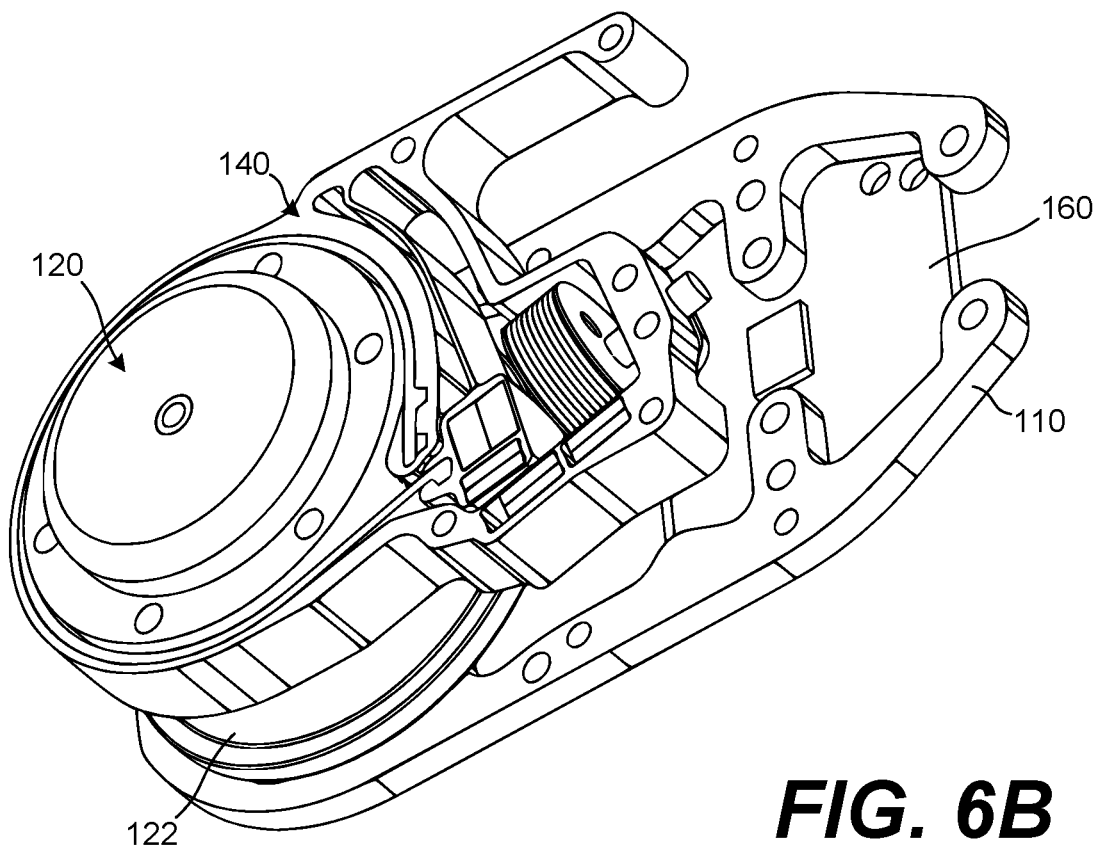
FIG. 6B illustrates a second brake assembly of the backdrivability control system shown in FIG. 2 according to various aspects of the embodiments of the present disclosure.

FIG. 6A illustrates the brake assembly 150 of the backdrivability control system 100 shown in FIG. 2, with the brake assembly 140 omitted from view, and FIG. 6B illustrates the brake assembly 140 of the backdrivability control system 100, with the brake assembly 150 omitted from view. Referring among FIGS. 6A and 6B, it is clear how the rotor 122 of the motor 120 extends through the clearance areas of the brake assemblies 140 and 150. It is also clear how the brake assembly 150 is reversed or rotated as compared to the brake assembly 140, although the brake assemblies 140 and 150 are otherwise the same in structure and function. By using both brake assemblies 140 and 150, rotated in position as compared to each other, the brake assemblies 140 and 150 can work together to halt or stop the rotor 122 from both clockwise and counter-clockwise rotation. The controller 160 can control or transition the brake assemblies 140 and 150 between the open and braking configurations, respectively. Depending on the type of backdrivability control needed, the controller 160 can control one or both of the brake assemblies 140 and 150 to operate in the braking configuration at any time.

Figure 7:
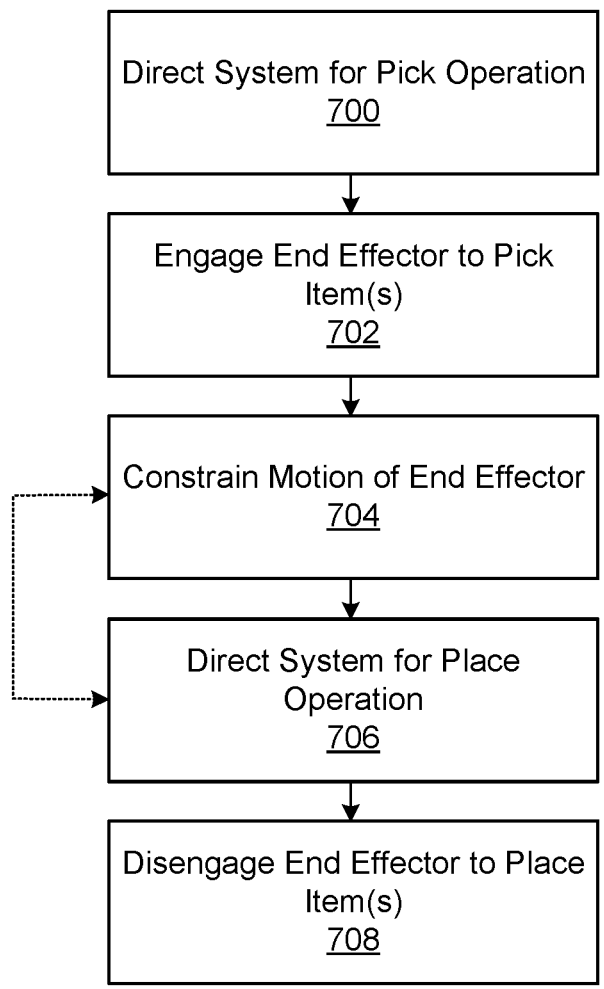
FIG. 7 illustrates a method for backdrivability control according to various aspects of the embodiments of the present disclosure.

FIG. 7 illustrates a method for backdrivability control according to various aspects of the embodiments of the present disclosure. The process shown in FIG. 7 is described in connection with the example robotic arm 10 and the backdrivability control system 100 described herein, although the method can be performed by other, related systems.

At step 700, the method includes directing the robotic arm 10 for a pick operation. For example, the controller 160 can direct one or more motors of the robotic arm 10 to move the end effector 30 to a certain position. The motion at step 700 can follow any predetermined route or be directed by any external feedback, such as vision (i.e., camera-based) data and other feedback systems to direct operations. Among other motors in the robotic arm 10, the controller 160 can direct the motor 120 to move to the end effector 30 to a certain position for picking an item or object, for example. As described above, the motor 120 can be a direct drive motor, and the controller 160 can provide power and/or control signals to drive the rotor 122 of the motor 120, among others in the robotic arm 10. The position can be one in which an armature or linkage of the robotic arm 10 reaches a certain location, bends at a certain angle, or meets another criteria to position the end effector 30 for an operation. During step 700, the brake assemblies 140 and 150 can be open, without constricting or braking the motor 120. Thus, at step 700, the end effector 30 can be loose or "floppy" to some extent and capable of adapting or conforming to the shapes or surfaces of objects for picking operations.

At step 702, the method includes the controller 160 engaging the end effector 30 to pick an item or object. The end effector 30 can be engaged in various ways, such as through gripping or grabbing armatures or linkages, the use of vacuum or suction, or other means. Step 702 can also include the controller 160 confirming through the use of sensors, such as pressure, force, or torque sensors, that an item has been gripped by the end effector 30.

At step 704, the method includes the controller 160 constraining the movement of the motor 120 and, thus, the end effector 30. The constraining can be achieved through control of the backdrivability control system 100. The extent of the constraining at step 704 can vary depending upon a number of factors, including the intended speed of the robotic arm 10 in subsequent steps, the size, shape, and weight of the item gripped by the end effector 30 at step 702, the intended position and orientation of the end effector 30 during and after subsequent motions, the effects of gravity, acceleration, deceleration, and other forces as the robotic arm 10 moves, and other factors. As described below, the controller 160 can direct the backdrivability control system 100 to completely arrest (i.e., rigidly hold) the motor 120 in place at step 704. Alternatively, the controller 160 can direct the backdrivability control system 100 to partially dampen or restrain movement of the motor 120, to an adjustable extent. In other cases, the controller 160 can arrest the motor 120 (and the end effector 30) for certain motions and restrain movement of the motor 120 for other motions during step 706.

For a complete arrest, the controller 160 can supply energizing current and/or control signals to the brake actuator 220 of the brake assembly 140 (and/or a similar actuator of the brake assembly 150) to constrain the motor 120 and the end effector 30 from movement. As described herein, brake bands in the brake assemblies 140 and 150 can tighten around and hold or fix the rotor 122 of the motor 120 in place. The motor 120 can be arrested in this way for any period of time, including during step 706.

For partially dampened or restrained movement, the controller 160 can supply sufficient energizing current and/or control signals to the brake actuator 220 of the brake assembly 140 (and/or a similar actuator of the brake assembly 150) to dampen or restrain the motor 120 and the end effector 30 from movement. As noted above, the brake actuator 220 can offer a granular or continuously-controllable range of forces for dampening or restraining movement of the rotor 122. The brake bands in the brake assemblies 140 and 150 can tighten around, apply friction to, and restrain movement of the rotor 122 in this case (but not necessarily arrest it in place). The motor 120 can be dampened or restrained in this way for any period of time, including during step 706. The use of braking or constraining at step 704 can vary depending upon the intended speed of the robotic arm 10 at step 706, the size, shape, and weight of the item gripped by the end effector 30 at step 702, the intended position and orientation of the end effector 30 at step 708, and other factors.

The application of braking and dampening at step 704 (and during step 706, among others) can achieve a number of advantages. For example, it can be more efficient to brake or dampen the motion of the motor 120 using the brake assemblies 140 and 150 than to attempt to counteract, counterbalance, or backdrive the movement of the motor 120 using motor energizing currents. Additionally, the use of the braking and dampening can be relied upon to achieve new types of motions in the robotic arm 10. The motions, using a combination of braking and continuously-controllable ranges of applied friction (e.g., dampening or restraining) can be more fluid, permit new and more flexible motions, and also facilitate the ability to pick and place items or objects in different ways.

At step 706, the method includes directing the robotic arm 10 for a place operation. The controller 160 can direct one or more motors of the robotic arm 10 to move the end effector 30 to a certain position for placing the item or object. The controller 160 can provide power and/or control signals to drive the rotor 122 of the motor 120, among others in the robotic arm 10, to move the end effector 30 at step 706. The motion at step 706 can follow any predetermined route or be directed by any external feedback, such as vision (i.e., camera-based) data and other feedback systems to direct operations. The final position at step 706 can be one in which an armature or linkage of the robotic arm 10, including the end effector 30, reaches a certain location, bends at a certain angle, or meets another criteria to place the item or object.

The extent of the braking or constraining imparted by the brake assemblies 140 and 150 can be adjusted over time during step 706 in some cases. For example, the end effector 30 can be loose or "floppy" at the start of step 706, continuously range from less to more restriction of motion for the motor 120 as the robotic arm 10 accelerates, completely arrest the rotor 122 when the robotic arm 10 reaches a constant speed, and continuously range from more to less restriction of motion for the motor 120 as the robotic arm 10 deaccelerates. Thus, the motion of the end effector can be dampened during certain periods of time and arrested during other periods of time.

At step 708, the method includes the controller 160 disengaging the end effector 30 to place the item or object. The end effector 30 can be disengaged in various ways, such as through releasing gripping or grabbing armatures or linkages, releasing vacuum or suction, or other means. Step 708 can also include the controller 160 confirming through the use of sensors, such as pressure, force, or torque sensors, that an item has been released by the end effector 30.

Figure 8:
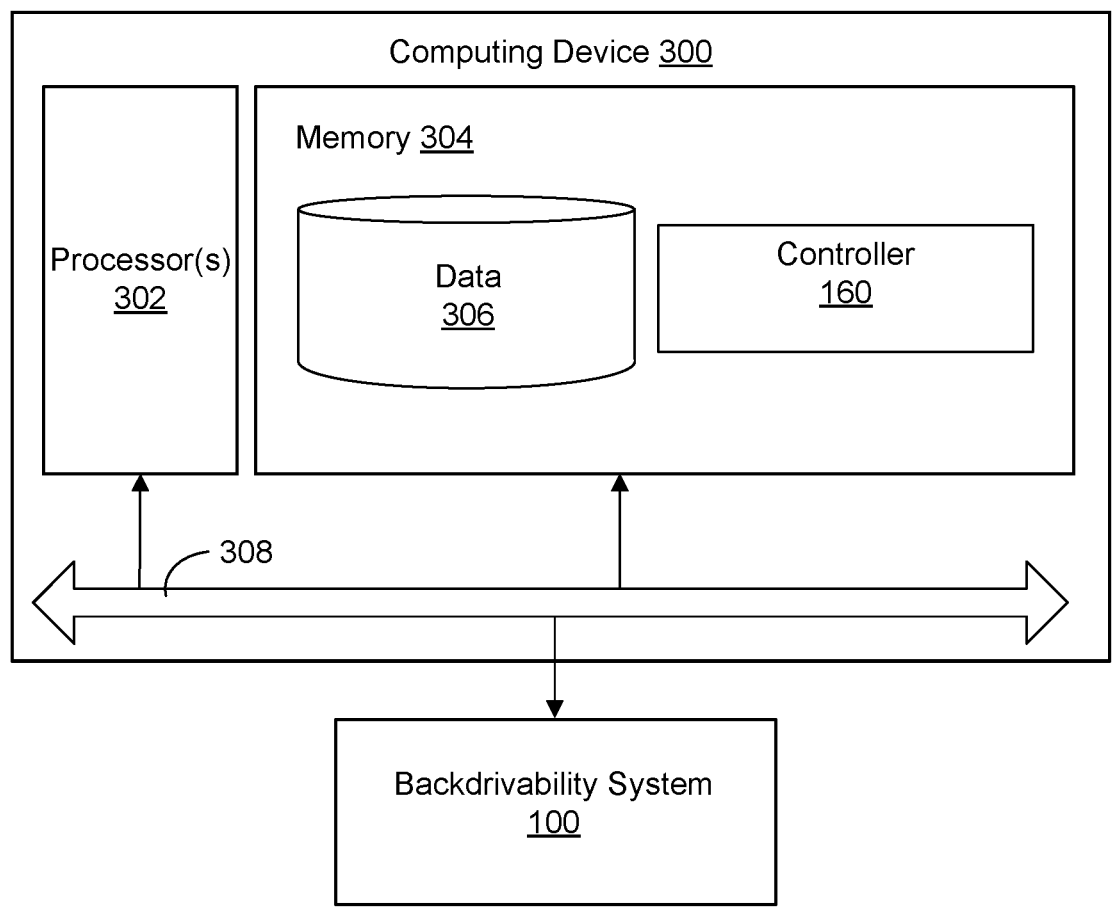
FIG. 8 illustrates an example computing device for a controller of the backdrivability control system shown in FIG. 2 according to various aspects of the embodiments of the present disclosure.

FIG. 8 illustrates an example computing device 300 for the controller 160 of the backdrivability control system 100 according to various aspects of the embodiments of the present disclosure. As shown, the controller 160 can be embodied in hardware, software, or a combination of hardware and software. As shown in FIG. 8, the computing device 300 includes at least one processing system, for example, having a processor 302 and a memory 304, both of which are electrically and communicatively coupled to a local interface 308. The local interface 308 can be embodied as a data bus with an accompanying address/control bus or other addressing, control, and/or command lines, for data communications and addressing between the processor 302, the memory 304, and the backdrivability control system 100.

In various embodiments, the memory 304 stores data 306 and other software or executable-code components executable by the processor 302. The data 306 can include data related to the operation of the backdrivability control system 100, the robotic arm 10, and other data. Among others, the executable-code components can include components associated with the controller 310 and an operating system for execution by the processor 302. Where any component discussed herein is implemented in the form of software, any one of a number of programming languages can be employed such as, for example, C, C++, C#, Objective C, JAVA®, JAVASCRIPT®, Perl, PHP, VISUAL BASIC®, PYTHON®, RUBY, FLASH®, or other programming languages.

The memory 304 stores software for execution by the processor 302. In this respect, the terms "executable" or "for execution" refer to software forms that can ultimately be run or executed by the processor 302, whether in source, object, machine, or other form. Examples of executable programs include, for example, a compiled program that can be translated into a machine code format and loaded into a random access portion of the memory 304 and executed by the processor 302, source code that can be expressed in an object code format and loaded into a random access portion of the memory 304 and executed by the processor 302, or source code that can be interpreted by another executable program to generate instructions in a random access portion of the memory 304 and executed by the processor 302, etc.

In various embodiments, the memory 304 can include both volatile and nonvolatile memory and data storage components. Volatile components are those that do not retain data values upon loss of power. Nonvolatile components are those that retain data upon a loss of power. Thus, the memory 304 can include, a random access memory (RAM), read-only memory (ROM), magnetic or other hard disk drive, solid-state, semiconductor, universal serial bus (USB) flash drive, memory card, optical disc (e.g., compact disc (CD) or digital versatile disc (DVD)), floppy disk, magnetic tape, or any combination thereof. In addition, the RAM can include, for example, a static random access memory (SRAM), dynamic random access memory (DRAM), or magnetic random access memory (MRAM), and/or other similar memory device. The ROM can include, for example, a programmable read-only memory (PROM), erasable programmable read-only memory (EPROM), electrically erasable programmable read-only memory (EEPROM), or other similar memory device. An executable program can be stored in any portion or component of the memory 304.

The processor 302 can be embodied as one or more microprocessors, one or more discrete logic circuits having logic gates for implementing various logic functions, application specific integrated circuits (ASICs) having appropriate logic gates, and/or programmable logic devices (e.g., field-programmable gate array (FPGAs), and complex programmable logic devices (CPLDs)).

If embodied in software, the controller 160 can include a module or group of code that includes program instructions to implement the specified logical function(s). The program instructions can be embodied in the form of source code that includes human-readable statements written in a programming language or machine code that includes machine instructions recognizable by a suitable execution system, such as a processor in a computer system or other system. Thus, the processor 302 can be directed by execution of the program instructions to perform certain processes, such as those illustrated in FIG. 7. In the context of the present disclosure, a non-transitory computer-readable medium can be any tangible medium that can contain, store, or maintain any logic, application, software, or executable-code component described herein for use by or in connection with an instruction execution system.

Also, one or more of the components described herein that include software or program instructions can be embodied in a non-transitory computer-readable medium for use by or in connection with an instruction execution system, such as the processor 302. The computer-readable medium can contain, store, and/or maintain the software or program instructions for execution by or in connection with the instruction execution system. The computer-readable medium can include a physical media, such as, magnetic, optical, semiconductor, and/or other suitable media or drives. Further, any logic or component described herein can be implemented and structured in a variety of ways. For example, one or more components described can be implemented as modules or components of a single application. Further, one or more components described herein can be executed in one computing device or by using multiple computing devices.

The flowchart or process diagram in FIG. 7 is representative of certain processes, functionality, and operations of the embodiments discussed herein. Each block can represent one or a combination of steps or executions in a process. Alternatively or additionally, each block can represent a module, segment, or portion of code that includes program instructions to implement the specified logical function(s). The program instructions can be embodied in the form of source code that includes human-readable statements written in a programming language or machine code that includes numerical instructions recognizable by a suitable execution system such as the processor 302.

Although the flowchart or process diagram in FIG. 7 illustrates a specific order, it is understood that the order can differ from that which is depicted. For example, an order of execution of two or more blocks can be scrambled relative to the order shown. Also, two or more blocks shown in succession can be executed concurrently or with partial concurrence. Further, in some embodiments, one or more of the blocks can be skipped or omitted. In addition, any number of counters, state variables, warning semaphores, or messages might be added to the logical flow described herein, for purposes of enhanced utility, accounting, performance measurement, or providing troubleshooting aids, etc. Such variations, as understood for implementing the process consistent with the concepts described herein, are within the scope of the embodiments.

Although embodiments have been described herein in detail, the descriptions are by way of example. The features of the embodiments described herein are representative and, in alternative embodiments, certain features and elements may be added or omitted. Additionally, modifications to aspects of the embodiments described herein may be made by those skilled in the art without departing from the spirit and scope of the present invention defined in the following claims, the scope of which are to be accorded the broadest interpretation so as to encompass modifications and equivalent structures.

Therefore, the following is claimed:

1. A robotic system, comprising:
   a joint in the robotic system; and
   a first assembly for backdrivability control of the joint, the first assembly comprising:
      a frame comprising a flexure arm and a circular clearance area that extends around the joint;
      a first brake band comprising one end secured along the circular clearance area, extending around the joint in the circular clearance area, and comprising a second end secured at an end of the flexure arm, the first brake band extending around the joint in a first direction;
      a brake actuator configured to selectively pull the end of the flexure arm and tighten the first brake band around the joint; and
   a second assembly for the backdrivability control of the joint, the second assembly comprising a second brake band that extends around the joint in a second direction.

2. The robotic system according to claim 1, wherein the brake actuator comprises a permanent magnet seated at the end of the flexure arm and an electromagnet seated in a brake actuator mount of the frame.

3. The robotic system according to claim 2, wherein, when the electromagnet is energized, the flexure arm pulls on the second end of the first brake band, to tighten the first brake band around the joint.

4. The robotic system according to claim 2, wherein the brake actuator further comprises at least one permanent magnet seated in the frame to provide a bi-stable permanent magnet arrangement.

5. The robotic system according to claim 1, wherein the brake actuator is configured to pull the end of the flexure arm with force to dampen rotation of the joint.

6. The robotic system according to claim 1, wherein the brake actuator is configured to pull the end of the flexure arm with force to fix the joint in place.

7. The robotic system according to claim 1, further comprising:
   a kinematic chain for rotational and translational displacement of the robotic system; and
   an end effector at an end of the kinematic chain, wherein the joint is positioned for rotational displacement of the end effector in the kinematic chain.

8. The robotic system according to claim 1, wherein the brake actuator comprises a magnetic bi-stable mechanism.

9. The robotic system according to claim 1, wherein a rotor of a motor extends through the circular clearance area.

10. An assembly for backdrivability control, comprising:
a frame comprising a flexure arm and a circular clearance area to extend around a joint in a robotic system;
a first brake band comprising one end secured along the circular clearance area, extending around the circular clearance area, and comprising a second end secured at an end of the flexure arm, the first brake band extending around the joint in a first direction;
a brake actuator configured to selectively pull the end of the flexure arm and tighten the first brake band; and
a second brake band that extends around the joint in a second direction.

11. The assembly according to claim 10, wherein the brake actuator comprises a permanent magnet seated at the end of the flexure arm and an electromagnet seated in a brake actuator mount of the frame.

12. The assembly according to claim 11, wherein, when the electromagnet is energized, the flexure arm pulls on the second end of the first brake band, to tighten the first brake band.

13. The assembly according to claim 11, wherein the brake actuator further comprises at least one permanent magnet seated in the frame to provide a bi-stable permanent magnet arrangement.

14. The assembly according to claim 10, wherein the brake actuator is configured to pull the end of the flexure arm with force to dampen rotation of the joint.

15. The assembly according to claim 10, wherein the brake actuator is configured to pull the end of the flexure arm with force to fix the joint in place.

16. The assembly according to claim 10, wherein the brake actuator comprises a magnetic bi-stable mechanism.

17. A method for backdrivability control, comprising:
directing a robotic system to a first position for a pick operation;
constraining motion of a joint in the robotic system using a brake assembly; and
directing the robotic system to a second position while constraining the motion of the joint, wherein the brake assembly comprises:
a frame comprising a flexure arm, a frame ring, and a circular clearance area that extends around the joint, the frame ring extending around the circular clearance area; and
a brake band comprising one end secured along the circular clearance area, extending around the joint in the circular clearance area, and comprising a second end secured at an end of the flexure arm.

18. The method according to claim 17, wherein constraining the motion of the joint comprises at least one of arresting the motion of the joint or dampening the motion of the joint.

19. The method according to claim 17, wherein constraining the motion of the joint comprises dampening the motion of the joint during a first period of time and arresting the motion of the joint during a second period of time.

20. The method according to claim 17, wherein the frame ring comprises a constriction channel, wherein the brake band extends through the constriction channel while constraining the motion of the joint.

* * * * *